Jan. 9, 1962   E. W. SEEGER   3,016,434
PERMANENT MAGNET ATTACHMENTS FOR ELECTROMAGNETICALLY
OPERABLE SWITCHING DEVICES
Original Filed Feb. 6, 1956

Inventor
Edwin W. Seeger, Deceased.
By Florence J. Seeger,
Executrix.
By W. E. Lyon
Attorney.

United States Patent Office 3,016,434
Patented Jan. 9, 1962

---

3,016,434
PERMANENT MAGNET ATTACHMENTS FOR ELECTROMAGNETICALLY OPERABLE SWITCHING DEVICES
Edwin W. Seeger, deceased, late of Wauwatosa, Wis., by Florence J. Seeger, Wauwatosa, Wis., executrix, assignor to Cutler-Hammer, Inc., Milwaukee, Wis., a corporation of Delaware
Continuation of application Ser. No. 563,526, Feb. 6, 1956. This application May 27, 1959, Ser. No. 816,337
8 Claims. (Cl. 200—87)

This invention relates to improvements in permanent magnet attachments for electromagnetically operable switching devices, and particularly to a permanent magnet attachment having a movable member tending to remain in and to return to one of several predetermined positions with respect to another member and after displacement of the movable member from one of such positions by a force extraneous to the device.

It is therefore one object of the present invention to provide a permanent magnet with a relatively stationary member and a member movable relatively to the stationary member and capable of assuming one of a number of stable positions when displaced from any one of such positions as an incident to operation of an associated electromagnetically operable switching device.

Another object of the invention is to provide a permanent magnet mechanism in which one member thereof is movable relatively to the other member and in which the poles of the members are so related as to produce a position of maximum stability and two other positions of lesser stability for the movable member, the movable member tending to remain in and to return to one of such positions depending upon the degree of displacement of the movable member relatively to the stationary member as an incident to operation of the associated electromagnetic switching device.

This application is a continuation of my copending application Serial No. 563,526, filed February 6, 1956, now abandoned.

The accompanying drawings illustrate two specific embodiments of the invention which will now be described, it being understood that various modifications may be made in the embodiments illustrated without departing from the spirit and scope of the appended claims.

Figure 1:
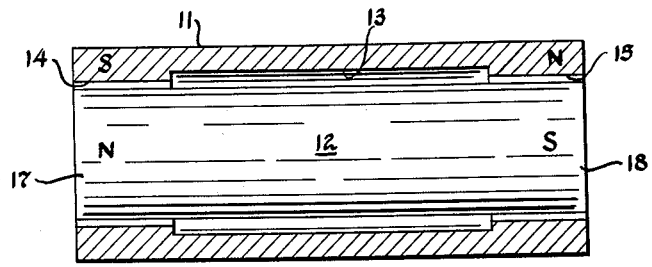
FIGURE 1 is a longitudinal cross-sectional view through a permanent magnet including a relatively stationary member and a member axially movable relatively to the stationary member.

Referring to FIG. 1 by reference numerals, 11 generally designates a first permanently magnetized member which is to be substantially stationary with respect to a second permanently magnetized member 12; both members being formed of any suitable permanently magnetizable metal. In the present application, the words "substantially stationary" and "movable" refer only to the relationship between the two magnetic members and the entire magnetic device may be movable as a whole or either member may be movable relatively to the other. Member 11 is generally formed as shown with a cylindrical passageway therein or therethrough and may be of uniform wall thickness and cylindrical shape although its external form may be varied if found necessary or desirable. However, the greater portion 13 of the passageway length intermediate the ends thereof is preferably of a larger diameter than the end portions of such passageway. The end portions 14 and 15 of smaller internal diameter are then the only portions of the passageway with which member 12 may engage.

Member 12 which is to be bodily movable relatively to member 11, is herein illustrated as being a solid cylinder of a size having an easy sliding fit in and as being of substantially the same length as member 11 so that both end faces of portions 17, 18 of member 12 can be positioned in substantially the planes of the ends of portions 14 and 15 of member 11. For uses requiring larger movements of member 12 than is necessitated by the particular use thereof herein illustrated, such member 12 may be shorter than member 11. The relatively movable member 12 may also have an intermediate portion of its length reduced in diameter for the same or a greater axial distance than that of the enlarged diameter portion 13 of the relatively stationary member 11.

Both members 11 and 12 are permanent magnets so that member 11 has south and north poles as indicated as its respective ends and member 12 has north and south poles as indicated, the two members being normally utilized with the poles of opposite sign in opposed relationship. Undercutting of member 11 at 13 has the effect of concentrating the magnetic pole action of such member at the end portions 14 and 15 thereof. If member 12 is also cut away or grooved to match member 11, a concentration of magnetic pole action will also occur at its end portions 17 and 18.

In the construction of and the position of the parts shown in FIG. 1 the member 12 is at its most stable position for the reason that two poles of opposed sign of each of the members are closely adjacent and the magnetic flux therefore has the shortest possible distance to travel through air. As a force external or extraneous to the device moves the member 12 to extend toward the right beyond the member 11 and bring the north pole of member 12 opposite the north pole of member 11, or to extend toward the left with poles of the same sign adjacent, the member 12 will pass through two other stable positions. In such two positions, however, only a single pole of each one of the members 11 and 12 are magnetically linked and only one-half of the maximum flux is available to resist change in position of the member 12. Another possible arrangement is to reverse member 12 from the position shown in FIG. 1 to bring the poles of the two members into S—S and N—N relation. Member 12 is then in its most unstable position but can again move either toward the right or toward the left from such position to bring unlike poles opposite and the member 12 will then be stable in either of the latter positions.

The exact location of the two stable positions when member 12 is "extended," depends upon the size and shape of the undercut portion 13 of said member 11, and upon the degree to which such undercut portion has surfaces acting as intermediate poles of the sign opposite to that at the end of member 11 nearest to such intermediate poles. If all surfaces of undercut 13 are "faired" relative to end portions 14, 15, there will be only negligible intermediate pole action. It is possible to calculate the exact location of the intermediate stable surfaces, but it is quicker to locate such positions by use of simple spring type weighing means which will measure the force required for moving member 12 into each of its two extended positions.

Figure 2:
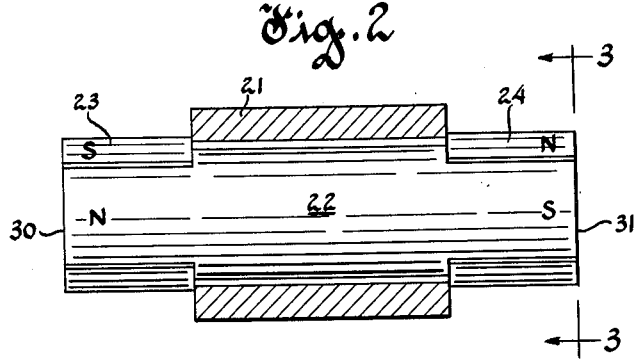
FIG. 2 is a longitudinal cross-sectional view through a permanent magnet including a relatively stationary member and a portion movable both axially and rotatably, relatively to the stationary member.
Figure 3:
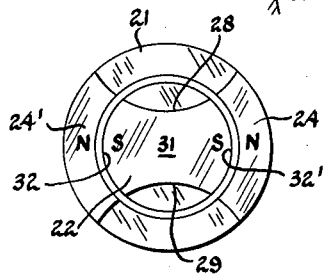
FIG. 3 is an end elevational view of the structure shown in FIG. 2.

In the construction shown in FIGS. 2 and 3, the relatively stationary member is generally designated 21 and the relatively movable member is generally designated 22 and is now both axially movable and magnetically rotatable with respect to member 21. The relatively stationary member 21 is also formed with a substantially cylindrical passage therein or therethrough into which member 22 fits in an easily slidable relation. However, two segments are preferably cut out of the wall of member 21 at each end thereof to provide pairs of extensions; one extension of each pair being shown at 23 and 24 in FIG. 2; and both extensions of one pair being shown in FIG. 3 at 24, 24′. The interior surfaces of such extensions are arcuate and have a magnetic pole effect. The relatively movable member 22 is again initially formed as a solid cylinder, but has two sectors cut out at the ends as indicated at 28 and 29 in FIG. 3, the sectors preferably matching the segments cut from the member 21. Endfaces 30, 31 of movable member 22 therefore have a somewhat hourglass shaped area and the ends of such member severally provide two arcuate lateral surfaces 32, 32′ of a shape and size matching the inner surfaces of the pairs of pole extensions (see 23, FIG. 2 and 24, 24′, FIG. 3) of member 21.

Member 21 thus presents two poles of like sign at each end thereof, the pairs of poles at different ends, of course, being of unlike sign. The respective pairs of end extensions of member 21 thus severally present a single pole, as shown at 24, 24′ in FIG. 3. Axial movement of member 22 relative to member 21 is due to the same action as aforedescribed and need not be repeated. When rotary action only is desired from the structure shown in FIG. 3, poles of unlike sign are placed adjacent each other and magnetic flux has the shortest possible travel through air, wherefore FIG. 3 represents the most stable condition of the present structure. If the member 22 in FIG. 3 is forcibly rotated clockwise to bring the pairs of faces 32, 32′ opposite the air gaps between the pairs of poles designated 24, 24′ of member 21, another stable position is reached. Clockwise rotation of member 22 through an angle of 180 degrees, to bring the faces 32, 32′ to positions thereof diagonally opposite to their respective locations in the second stable position, provides a third stable position. In the present construction endwise reversal of the position of member 22 within member 21 brings poles of like sign adjacent whereby the position of greatest stability is reached when the faces 32, 32′ are opposite the air gaps between the pairs of poles 24 and 24′. Only two stable positions are then available at such relative rotary positions spaced 180° from each other.

Figure 4:
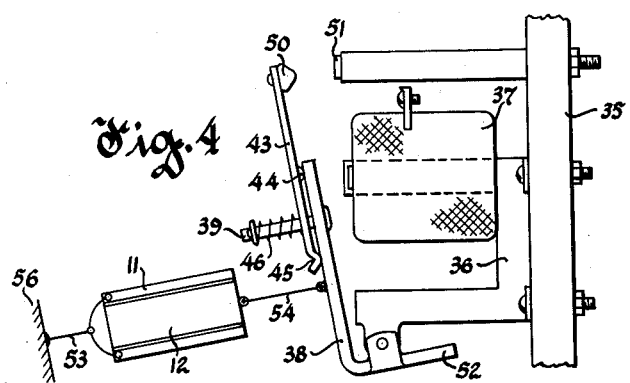
FIG. 4 is an electromagnetically operated switch, which is generally of the known type, for illustration schematically of one use of any one of a group of permanent magnets herein disclosed.

One advantageous use of the first embodiment (FIG. 1) of the invention is illustrated schematically in FIG. 4 in connection with an electromagnetic switch or relay. A mounting 35 supports a U-shaped member 36 having a coil 37 mounted on one leg thereof and coacting with such leg to form an electromagnet. The other leg of member 36 provides a pivot point for the armature 38 of an electromagnet which acts to make or break an electric circuit. The electromagnet armature comprises a relatively heavy bell-crank 38 on which is fixed a pin 39 for loosely holding a contact bar 43. The contact bar 43 has two projections 44 and 45 bearing on the upwardly projecting arm of bell-crank 38 under the pressure of spring 46 on the pin 39. A contact 50 on the bar 43 is connected with one side of the electric circuit in any suitable manner and a contact 51 on the mounting 35 is connected with the other side of the electric circuit to be controlled.

When the coil 37 is energized the movable contact structure 38—50 pivots toward the right to bring contacts 50, 51 into engagement. When coil 37 is de-energized the contact carrying structure 38—50 drops away from the electromagnet core to permit disengagement of contacts 50 and 51, as shown in FIG. 4. Unless means is provided to act as a damper for the contact carrying mechanism 38—50, such mechanism bounces back and the striking-bouncing action may repeat a number of times before the mechanism is at rest.

If a magnetic device, such as shown in FIG. 1, has its member 11 attached to a fixed support as indicated at 56 in FIG. 4 and the movable member 12 is attached to the arm of bellcrank 38, by means of suitable links 53, 54, respectively, relative movement of the magnetic parts 11, 12 will stop when the contact-carrying arm is in a position between the full open and the fully closed positions of contacts 50 and 51. The contact arm is therefore not subjected to one or more additional swings and the distance to be traveled from open to closed position is shorter than heretofore. The force of each impact of contact 50 on contact 51 is reduced, which decreases contact wear and noise of operation. The speed of closing of the contacts 50, 51 and of coming to a rest position, by the contact-carrying mechanism, is increased. The amount of required movement of the contact-carrying arm 43 is reduced, which further reduces wear of parts. It will be understood that the attaching means 53, 54 should be such that a minimum of friction occurs between the magnetic members 11 and 12. Such attaching means are preferably rigid, with pivots at the points of connection with the magnetic members 11 and 12, and with the rigid support 56 and with the adjacent arm of bell-crank 38. Obviously, the magnet 21, 22 of FIGS 2 and 3 may also be used for the purpose above described, the only difference being that the attaching means 54 then must be such as to permit relative rotation of parts 21, 22 and of the attaching means 54 relative to the contact carrying arm of bell-crank 38.

Friction between stationary members 11 (FIG. 1) or 21 (FIGS. 2 and 3) movable members 12 or 22, respectively, can be reduced by use of a lubricant such as powdered graphite which is also a magnetic flux conductor. Graphite will, therefore, aid also in minimizing the air-gap through which the flux must pass between the poles of the two members.

I claim:

1. In an electromagnetically operable switching device, in combination, a stationary electromagnet, a contact carrying armature associated with said electromagnet and operable upon energization of the latter to complete an electric circuit, a stationary permanent magnet spaced from said armature, a movable permanent magnet positioned in the magnetic field of said stationary magnet, the north and south poles of said movable permanent magnet having a predetermined relation to the magnetic poles of said stationary magnet whereby said movable permanent magnet is afforded at least one stable position relative to and in the magnetic field of said stationary magnet, means for connecting said movable permanent magnet to said armature for movement by the latter relative to said stable position whereby said permanent magnets effectively damp armature vibration when said electromagnet is operated.

2. The combination according to claim 1, wherein at least one of said permanent magnets is provided with a cut out portion to alter the magnetic field thereof, thereby affording said movable permanent magnet a plurality of stable positions relative to and in the magnetic field of said stationary magnet.

3. The combination according to claim 1, wherein said movable permanent magnet has its magnetic poles normally positioned opposite like magnetic poles of said stationary permanent magnet.

4. The combination according to claim 1, wherein said movable permanent magnet has its magnetic poles normally positioned opposite unlike magnetic poles of said stationary permanent magnet.

5. In an electromagnetically operable switching device, in combination, a stationary electromagnet, a contact carrying armature associated with said electromagnet and operable upon energization of the latter to complete an electric circuit, an axially magnetized permanent magnet attached to said armature and movable therewith, and a second axially magnetized stationary permanent magnet mounted in concentric relationship to the first mentioned magnet and enclosing at least a portion of the same, said magnets being located in closely spaced relation with each other and arranged with poles of opposite polarity located opposite each other, said arrangement causing the magnetomotive forces between the magnets to produce a dampening effect upon the movement of the first mentioned magnet when said electromagnet is deenergized.

6. In an electromagnetically operable switching device, in combination, a stationary electromagnet, a contact carrying armature associated with said electromagnet and operable upon deenergization of the latter to complete an electric circuit, an axially magnetized permanent magnet attached to said armature and movable therewith, and a second axially magnetized stationary permanent magnet mounted in concentric relationship to the first mentioned magnet and enclosing at least a portion of the same, said magnets being located in closely spaced relation with each other and arranged with poles of like polarity located opposite each other, said arrangement causing the magnetomotive forces between the magnets to produce a dampening effect upon the movement of the first mentioned magnet when said electromagnet is deenergized.

7. In an electromagnetically operable switching device in combination, a stationary electromagnet, a contact carrying armature associated with said electromagnet and operable upon energization of the latter to complete an electric circuit, a stationary, axially magnetized, permanent magnet having a substantially cylindrical opening therethrough, and a second axially magnetized permanent magnet axially reciprocable and rotatable within said opening, said second magnet being rigidly attached to said armature for longitudinal and rotary movement therewith, the first mentioned magnet having end portions cut away to form pairs of arcuate pole extensions and said second magnet having end portions cut away to form pole surfaces substantially coextensive with the internal surfaces of said pole extensions, said magnets having opposite axial poles arranged opposite each other to provide a plurality of stable longitudinal and rotary positions therebetween.

8. In a permanent magnet device, in combination, a substantially cylindrical axially magnetized permanent magnet having a substantially cylindrical opening therethrough and a second axially magnetized permanent magnet axially reciprocable and rotatable within said opening, the first mentioned magnet having its end portions cut away to form pairs of arcuate pole extensions and said second magnet having its end portions cut away to form pole surfaces substantially coextensive with the internal surfaces of said pole extensions, said magnets having poles of opposite polarity located opposite each other to cause the resulting magnetomotive forces to tend to retain the first mentioned magnet in one of a plurality of stable longitudinal and rotary positions relative to said second magnet.

References Cited in the file of this patent
UNITED STATES PATENTS

| | | |
|---|---|---|
| 2,585,714 | Wrobel et al. | Feb. 12, 1952 |
| 2,719,485 | Bendar | Oct. 4, 1955 |
| 2,783,326 | Hanson et al. | Feb. 26, 1957 |
| 2,853,576 | Tigerschiold | Sept. 23, 1958 |
| 2,869,563 | Schoengrun | Jan. 20, 1959 |